United States Patent
Bortnikov et al.

(10) Patent No.: US 10,089,318 B2
(45) Date of Patent: Oct. 2, 2018

(54) CONTRACTING AND/OR DE-CONTRACTING STORED PARAMETERS

(71) Applicant: Excalibur IP, LLC, New York, NY (US)

(72) Inventors: Edward Bortnikov, Haifa (IL); Amir Langer, Haifa (IL)

(73) Assignee: Excalibur IP, LLC, New York, NY (US)

( * ) Notice: Subject to any disclaimer, the term of this patent is extended or adjusted under 35 U.S.C. 154(b) by 260 days.

(21) Appl. No.: 14/586,671

(22) Filed: Dec. 30, 2014

(65) Prior Publication Data

US 2016/0188411 A1   Jun. 30, 2016

(51) Int. Cl.
*G06F 17/30* (2006.01)

(52) U.S. Cl.
CPC .............................. *G06F 17/30156* (2013.01)

(58) Field of Classification Search
CPC ................................................ G06F 17/30156
See application file for complete search history.

(56) References Cited

U.S. PATENT DOCUMENTS

| | | | |
|---|---|---|---|
| 5,532,693 A | 7/1996 | Winters et al. | |
| 6,414,610 B1 | 7/2002 | Smith | |
| 6,735,434 B2* | 5/2004 | Criss | G06F 8/65 455/418 |
| 7,949,662 B2* | 5/2011 | Farber | G06F 17/30091 707/698 |
| 8,321,439 B2* | 11/2012 | Pudipeddi | G06F 11/1417 707/758 |
| 8,341,200 B2* | 12/2012 | Corella | H04L 63/08 707/782 |
| 9,317,377 B1* | 4/2016 | Wu | G06F 11/1453 |
| 9,336,214 B2* | 5/2016 | Tam | G06F 17/30067 |
| 9,553,954 B1* | 1/2017 | Akhter | H04L 69/04 |
| 2009/0164440 A1* | 6/2009 | Pudipeddi | G06F 11/1417 |
| 2012/0259822 A1* | 10/2012 | Medgyesi | G06F 9/44557 707/693 |

OTHER PUBLICATIONS

Mandi, et al, "Implementing a Novel Approach an Convert Audio Compression to Text Coding via Hybrid Technique," International J. Computer Science Issues, Nov. 2012, pp. 53-59.
Mahmud, "An Improved Data Compression Method for General Data," International J. Scientific & Engineering Research, Mar. 2012, pp. 1-4.
Korn, et al, The VCDIFF Generic Differencing and Compression Data Format, available at http://tools.ietf.org/html/rfc3284 (accessed Feb. 2, 2015), pp. 1-29.
Huffman, A Method for the Construction of Minimum-Redundancy Codes, Proceedings of the I.R.E., Sep. 1952, pp. 1098-1101.
Witten, et al, Arithmetic Coding for Data Compression, Communications of the ACM, Jun. 1987, pp. 520-540.
Xie, et al, Improving MapReduce Performance through Data Placement in Heterogeneous Hadoop Clusters, Procedings of the 19th International Heterogeneity in Computing Workshop, Apr. 2010, pp. 1-9, available at http://www.eng.auburn.edu/~eqin/pubs/hcw10.pdf (accesed Feb. 2, 2015).

* cited by examiner

*Primary Examiner* — Debbie Le
(74) *Attorney, Agent, or Firm* — Berkeley Law & Technology Group, LLP (57) ABSTRACT

Briefly, methods and/or systems of contracting and/or de-contracting stored parameters are disclosed.

20 Claims, 4 Drawing Sheets

CONTRACTING AND/OR DE-CONTRACTING STORED PARAMETERS

FIELD

The subject matter disclosed in this application relates to contracting and/or de-contracting stored parameters.

INFORMATION

One or more parameters may be descriptive of a collection of signal samples and exist in the form of physical signals and/or physical states, such as memory states. In an example, one or more parameters relevant to content comprising a technical article may include one or more authors, for example. Likewise, another type of stored parameter comprises a file identifier, e.g., a reference and/or name to identify a collection of signal samples. The term file and/or similar terms are used here in a generic sense to refer to a collection of stored signal samples.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings, in which:

Reference is made in the following detailed description and accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples, for example, may be allocated among computing devices, including one or more clients and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

An example of a distributed computing system is the Hadoop distributed computing system, which employs a map-reduce type of architecture. In the context, the terms map-reduce architecture and/or similar terms are intended to refer a distributed computing system implementation for processing and/or for generating large sets of signal samples employing a parallel, distributed process performed over a network of individual computing devices. A map operation and/or similar terms refer to processing of signals to generate one or more key-value pairs and to distribute the one or more pairs to the computing devices of the network. A reduce operation and/or similar terms refer to processing of signals via a summary operation (e.g., such as counting the number of students in a queue, yielding name frequencies). A system may employ such an architecture for processing by marshalling distributed servers, running various tasks in parallel, and managing communications and signal transfers between various parts of the system, in an embodiment. As mentioned, one non-limiting, but well-known example, is the Hadoop distributed computing system. It refers to an open source implementation of a map-reduce type architecture, but may include other aspects, such as the Hadoop distributed file system (HDFS). In general, therefore, Hadoop and/or similar terms refers to an implementation scheduler for executing large processing jobs using a map-reduce architecture.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. As mentioned, signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be compliant and/or compatible with differing protocols, such as computing and/or communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes so as to be capable to transmit signal packets and/or frames between devices of particular nodes including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but such devices outside the private network may not necessarily be able to direct inbound network communications to devices included in the private network.

The Internet refers to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately compatible and/or compliant signal packets and/or frames. It is noted that there are several versions of the Hypertext Transfer Protocol. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility that may be accessible to tens of millions of people or more worldwide. Also, in an embodiment, and as mentioned above, the terms "WWW" and/or "Web" refer to a part of the Internet that complies with the Hypertext Transfer Protocol. The Internet and/or the Web, therefore, in this context, may comprise an service that organizes stored content, such as, for example, text, images, video, etc., through the use of hypermedia, for example. A HyperText Markup Language ("HTML"), for example, may be utilized to specify content and/or to specify a format for hypermedia type content, such as in the form of a file and/or an "electronic document," such as a Web page, for example. An Extensible Markup Language ("XML") may also be utilized to specify content and/or format of hypermedia type content, such as in the form of a file or an "electronic document," such as a Web page, in an embodiment. Of course, HTML and/or XML are merely example languages provided as illustrations. Furthermore, HTML and/or XML (and/or similar terms) is intended to refer to any version, now known and/or later developed of these languages. Likewise, claimed subject matter is not intended to be limited to examples provided as illustrations, of course.

As used herein, the term "Web site" and/or similar terms refer to a collection of related Web pages. Also as used herein, "Web page" and/or similar terms refer to any electronic file and/or electronic document, such as may be accessible via a network, including by specifying a URL for accessibility via the Web, in an example embodiment. As alluded to above, in one or more embodiments, a Web page may comprise content coded using one or more languages, such as, for example, markup languages, including HTML and/or XML, although claimed subject matter is not limited in scope in this respect. Also, in one or more embodiments, application developers may write code in the form of JavaScript, for example, to provide content to populate one or more templates, such as for an application. The term 'JavaScript' and/or similar terms are intended to refer to any now known and/or later developed version of this programming language. However, JavaScript is merely an example programming language. As was mentioned, claimed subject matter is not intended to be limited to examples and/or illustrations.

As used herein, the terms "entry", "electronic entry", "document", "electronic document", "content", "digital content", "item", and/or similar terms are meant to refer to signals and/or states in a physical format, such as a digital signal and/or digital state format, e.g., that may be perceived by a user if displayed, played and/or otherwise executed by a device, such as a digital device, including, for example, a computing device, but otherwise might not necessarily be perceivable by humans (e.g., in a digital format). Likewise, in this context, content (e.g., digital content) provided to a user in a form so that the user is able to perceive the underlying content itself (e.g., hear audio or see images, as examples) is referred to, with respect to the user, as 'consuming' content, 'consumption' of content, 'consumable' content and/or similar terms. For one or more embodiments, an electronic document may comprise a Web page coded in a markup language, such as, for example, HTML (hypertext markup language). In another embodiment, an electronic document may comprise a portion or a region of a Web page. However, claimed subject matter is not intended to be limited in these respects. Also, for one or more embodiments, an electronic document and/or electronic entry may comprise a number of components. Components in one or more embodiments may comprise text, for example, in the form of physical signals and/or physical states (e.g., capable of being physically displayed). Also, for one or more embodiments, components may comprise a graphical object, such as, for example, an image, such as a digital image, and/or sub-objects, such as attributes thereof, which, again, comprise physical signals and/or physical states (e.g., capable of being physically displayed). In an embodiment, content may comprise, for example, text, images, audio, video, and/or other types of electronic documents and/or portions thereof, for example.

Also as used herein, one or more parameters may be descriptive of a collection of signal samples, such as one or more electronic documents, and exist in the form of physical signals and/or physical states, such as memory states. For example, one or more parameters, such as referring to an electronic document comprising an image, may include parameters, such as time of day at which an image was captured, latitude and longitude of an image capture device, such as a camera, for example, etc. In another example, one or more parameters relevant to content, such as content comprising a technical article, may include one or more authors, for example. Claimed subject matter is intended to embrace meaningful, descriptive parameters in any format, so long as the one or more parameters comprise physical signals and/or states, which may include, as parameter examples, name of the collection of signals and/or states (e.g., file identifier name), technique of creation of an electronic document, purpose of an electronic document, time and date of creation of an electronic document, logical path of an electronic document (or portion thereof), encoding formats and/or standards used for encoding an electronic document, and so forth.

Signal packets and/or frames, also referred to as signal packet transmissions and/or signal frame transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet and/or frame may, for example, be communicated via a communication channel and/or a communication path, such as comprising a portion of the Internet and/or the Web, from a site via an access node coupled to the Internet. Likewise, a signal packet and/or frame may be forwarded via network nodes to a target site coupled to a local network, for example. A signal packet and/or frame communicated via the Internet and/or the Web, for example, may be routed via a path comprising one or more gateways, servers, etc. that may, for example, route a signal packet and/or frame in accordance with a target and/or destination address and availability of a network path of network nodes to the target and/or destination address. Although the Internet and/or the Web comprises a network of interoperable networks, not all of those interoperable networks are necessarily available and/or accessible to the public.

In particular implementations, a network protocol for communicating between devices may be characterized, at least in part, substantially in accordance with a layered description, such as the so-called Open Systems Interconnection (OSI) seven layer approach and/or description. A network protocol refers to a set of signaling conventions, such as for computing and/or communications transmissions, as may, for example, take place between and/or among devices in a network, typically network devices; for example, devices that substantially comply with the protocol and/or that are substantially compatible with the protocol. In this context, the term "between" and/or similar terms are understood to include "among" if appropriate for the particular usage and vice-versa. Likewise, in this context, the terms "compatible with", "comply with" and/or similar terms are understood to include substantial compliance and/or substantial compatibility.

Typically, a network protocol, such as protocols characterized substantially in accordance with the aforementioned OSI description, has several layers. These layers may be referred to here as a network stack. Various types of transmissions, such as network transmissions, may occur across various layers. A lowest level layer in a network stack, such as the so-called physical layer, may characterize how symbols (e.g., bits and/or bytes) are transmitted as one or more signals (and/or signal samples) over a physical medium (e.g., twisted pair copper wire, coaxial cable, fiber optic cable, wireless air interface, combinations thereof, etc.). Progressing to higher-level layers in a network protocol stack, additional operations may be available by initiating network transmissions that are compatible and/or compliant with a particular network protocol at these higher-level layers. For example, higher-level layers of a network protocol may, for example, affect device permissions, user permissions, etc.

A virtual private network (VPN) may enable a remote device to more securely (e.g., more privately) communicate via a local network. A router may allow network communications in the form of network transmissions (e.g., signal packets and/or frames), for example, to occur from a remote device to a VPN server on a local network. A remote device may be authenticated and a VPN server, for example, may create a special route between a local network and the remote device through an intervening router. However, a route may be generated and/or also regenerated if the remote device is power cycled, for example. Also, a VPN typically may affect a single remote device, for example, in some situations.

A network may be very large, such as comprising thousands of nodes, millions of nodes, billions of nodes, or more, as examples. With networks, such as the Internet and/or the Web, gaining popularity, and with a vast quantity of digital content, such as pages, other electronic documents, other media content and/or applications, becoming available to users, such as via the Web, it may be desirable to provide more efficient and/or more streamlined approaches to gather, organize and/or display content, such as digital content, for example. Internet-type business entities, such as Yahoo!, for example, may provide a wide range of content, such as digital content, that may be made available to users, such as via the Web and/or the Internet.

Storage (e.g., memory) generally comprises various types of media used to store digital content (e.g. SRAM, DRAM, flash memory, compact disk, digital versatile disk, etc.), as well as various additional components, so that the media, for example, is able to operate and communicate with other devices and/or components, such as, if included in a computing device, the rest of the computing device, or if external storage, another device, such as a computing device. Some non-limiting examples include hard disks, magnetic tape, integrated circuits, such as random access memory (RAM) and/or flash memory, optical storage disks, such as a compact disk (CD) or a digital versatile disk (DVD), and/or others.

Figure 1:
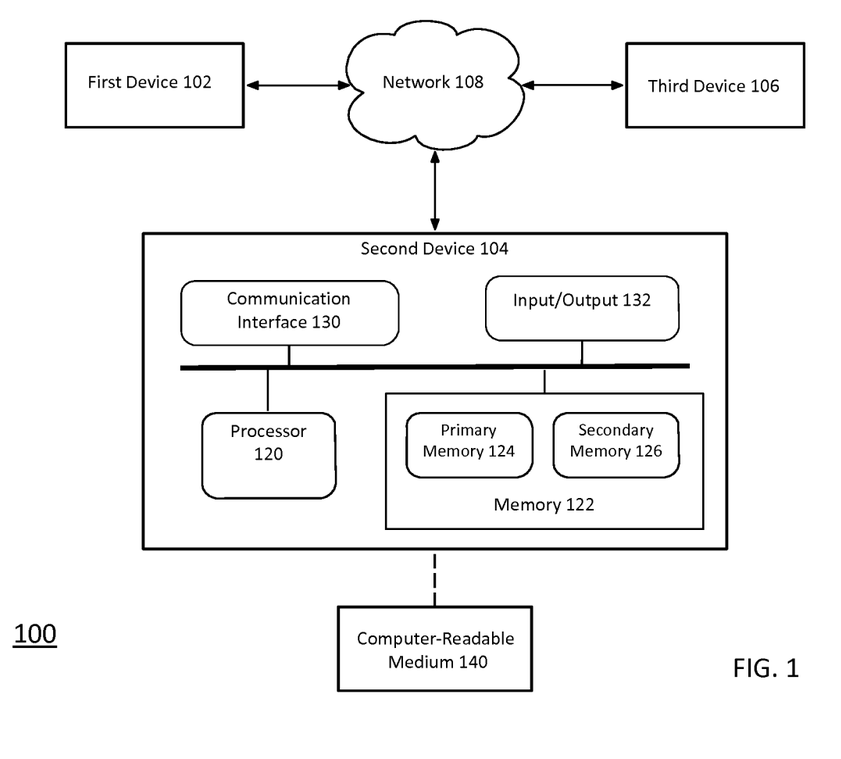
FIG. 1 shows a schematic diagram of an embodiment of a network including example embodiments of computing devices.

Some computing devices may use a storage configuration that is hierarchical, described in more detail below by illustrative examples. Thus, in some devices, faster types of memory (such as RAM) may typically be located relatively close to a processor (sometimes referred to as a central processing unit (CPU)), while slower forms of memory (such as a mass storage device) may typically be located relatively farther away from a processor. A processor (e.g., CPU) comprises a component of a computing device able to perform signal processing, such as with respect to digital content, typically by executing computations, for example. The terms "main memory," "primary memory," "active memory" and/or similar terms refer to the portion of memory of a computing device and/or system with which the processor (e.g., CPU) of the computing device or system is able to interact in order to process stored memory contents. Main, primary or active memory may be contrasted with secondary memory, which typically is slower to read from and/or write to than active memory. FIG. 1, as an example, shows an embodiment of a computing device with primary memory 124.

For Web-scale collections (e.g., a distributed file system), stored file identifiers may occupy terabytes of storage space or more. The term "distributed file system" and/or similar terms as used in this application means a file system in which files stored on separate devices in a network are capable of being managed and processed as if the files are stored on one device. Likewise, for a distributed file system, stored file identifiers may often be stored in random-access memory (RAM) for memory-speed access. For example, for a Hadoop distributed computing system, as one example, file identifiers are typically retained in active memory. Similarly, file identifiers for a distributed system may typically be maintained on one server. That is, while, in general, content stored by a distributed system may not necessarily be stored by a single, self-contained system, file identifiers, by contrast, generally are stored in such a manner, e.g., in a single, self-contained system. Thus, active memory may, in effect, limit size of a distributed file system, for example.

For some file systems, if file identifiers are not necessarily all made available via active memory, some existing approaches may involve storing infrequently accessed file identifiers using secondary memory and/or mass storage. In that case, though, those file identifiers may not be accessed quickly, which may be undesirable.

A memory component of a computing device, such as a computer, for example, typically comprises a file system; however, external memories also typically include a file system. Many approaches to a file system exist; however, typically, a file system comprises a particular organization and format for storing physical states, such as memory states, so that physical states of memory may be read and/or so that physical states of memory may be written in manageable groupings.

Typically, a distinction is made between physical memory and logical memory. Physical memory generally refers to physical storage elements of memory; whereas logical memory generally refers to an address space, assigned to a logical partition of the physical memory. Typically, content is stored in memory locations in a binary format. That is, a physical memory address location may comprise a series of contiguous memory cells in which an individual cell is able to store a binary "1" or a binary "0." The number of cells in a memory location may vary depending on the particular computing device or system, but is usually a power of 2, such as 32 or 64. Thus, a variety of approaches to convert stored binary states into a form of content, such as a character, exist. One example comprises ASCII, abbreviated from American Standard Code for Information Interchange. ASCII comprises a character-encoding scheme that encodes 128 specified characters as 7-bit binary digital signals and is available from the American National Standards Institute.

Programs executable by a computing device or system, therefore, interact with memory in terms of an address space and components of physical memory operate to make differences between physical and logical memory seamless or transparent. Thus, contents and format of a filename (e.g., file identifier) generally depend on the particular operating system of the computing device.

One type of parameter comprises a filename (e.g., file identifier). A filename may comprise a string of letters, digits, and/or other characters to identify digital content stored in memory, such as in memory of a computing device and/or system. A filename (e.g., file identifier) may include one or more segments separately by delimiters. That is, if more than one segment is employed, a delimiter may be employed to separate the segments. While a delimiter could be any character, delimiters in file identifiers often comprise dots (.), hyphens (-), and/or underscores (_). For example, in the filename "Hybrid_735878_SID.dat," the two underscores and the dot comprise delimiters.

Use of segments at times may be at least partially descriptive. As a simple example, a word document may have a file identifier "my.story.doc." in which "my", "story" and "doc" comprise segments and in which periods are used as delimiters. Segments typically may also be employed with a hierarchically organized file system. Furthermore, a file system that may be organized hierarchically may employ segments in a manner to be at least partially descriptive, as examples illustrate below.

Figure 3:
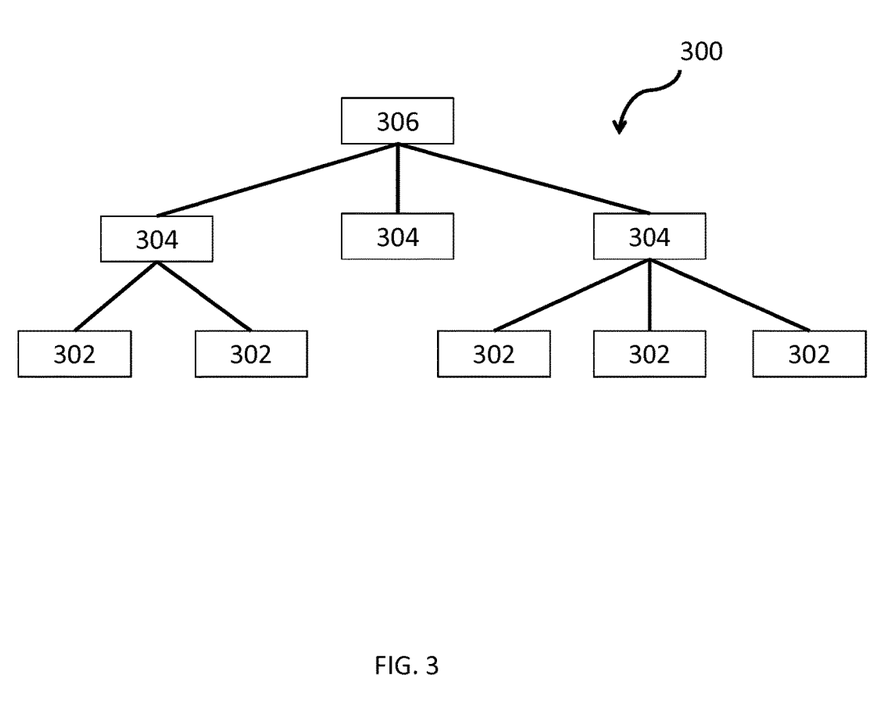
FIG. 3 is a schematic representation of a hierarchical file structure of an embodiment.

A non-limiting example of a hierarchical file structure is shown in FIG. 3 in which directory 306 has sub-directories 304. Likewise, sub-directories 304 have further sub-directories 302. Along these lines, the term "sub-directory" and/or similar terms as used in this application means a directory in a file system that has at least one parent directory. A sub-directory may also have one or more child directories, but that is not required.

A filename (e.g., file identifier) may be user-generated. Thus, a user may specify one or more segments of a filename. A filename may also be device-generated, such as by software executing a process. Typical processes in software for generating filenames include a generator of random alphanumeric strings, a numerical counter, or a combination.

Thus, in a simple example, to illustrate a possible, non-limiting, example of a hierarchical organization, a law firm name may comprise: BLTG. Thus, all files for the law firm, BLTG, may be stored in a directory called "BLTG." A sub-directory "patentapplications" may store all patent applications prepared by the firm. A sub-directory of that, "hightechco" may store all the patent applications for a client, "HighTech Co." Finally, a patent application that is stored as a word document under the name "memoryinvention," for example, may have a title "Memory Invention." Thus, a file identifier for a word document for that patent application may comprise:

"bltg.patentapplications.hightechco.memoryinvention.doc."

In this example, periods operate as delimiters and ".doc" comprises a file extension to designate it as a word document. However, consider another patent application by BLTG for HighTech Co with the title "Processor Invention." It may have a file identifier for a word document for that patent application as follows:

"bltg.patentapplications.hightechco.processorinvention.doc."

Stored parameters (as a non-limiting example, stored file identifiers) may occupy terabytes of storage space or more for Web- or network-scale collections, for example. As mentioned, for a distributed file system, stored parameters are often stored in RAM so as to be accessible at higher speed than if stored elsewhere, such as by a mass storage device. For example, as was mentioned, file identifiers are often stored in active memory. Thus, as previously indicated, active memory may limit effective system size in terms of content storage, such as for a distributed file system.

However, the BLTG example above illustrates that file identifiers may employ segments that share a common textual or numerical string or pattern, referred to here as redundancy. More to the point, a substantial portion of segments employed, such as for file identifiers, exhibit redundancy. Redundancy is especially high in systems having hierarchically organized stored parameters, such as file identifiers, as a result of repetition in file names, suggested by the BLTG example above. Likewise, program generated parameters also tend to exhibit high redundancy.

Thus, for parameters, such as file identifiers, that share the same segments, the file identifier may be broken down into its constituent segments, and a contracted version of the segments, referred to as contraction mode, may be used for more efficient memory usage. Likewise, the term "subcollection of segments" as used in this application means segments of a group of stored parameters having a corresponding position within respective parameters. Thus, in the BLTG example above, "BLTG," as an example, in both file identifiers above, occupies a corresponding position.

In addition to hierarchy, as a non-limiting example, where a collection of stored parameters comprises a collection of stored file identifiers, file extensions also exhibit redundancy. Non-limiting examples of file extensions, or filename extensions, comprise: dat, txt, exe, or jpeg, although there are numerous other file extensions in use.

Thus, in an embodiment, as alluded to above, more efficient storage may be implemented for stored parameters, such as file identifiers, via implementation of a contraction mode to form contracted segments. For example, for some embodiments, contraction of stored parameters may result in storage usage reduction by well over 50% on average. Some embodiments may also retain accessibility of contracted parameters, meaning that a contracted parameter is able to be de-contracted relatively quickly. As such, an embodiment, for example, may result in a smaller memory footprint so that in effect, more content is able to be accommodated.

The term "contraction mode" and/or similar terms as used in this application means lossless compression employed with respect to one or more segments of a stored parameter, such as a file identifier, for example. It is noted that claimed subject matter is not limited in scope as to a particular example of lossless compression. That is, any one of a significant variety of types of lossless compression may be employed. Likewise, the term "contracted segment" as used in this application refers to a segment of a stored parameter that has been compressed (e.g., contracted). A contracted parameter or a contracted file identifier may comprise one or more contracted segments. As such, a contracted file identifier, for example, may occupy fewer bits (e.g., cells) of memory than a file identifier that is not contracted. Thus, method embodiments and/or system embodiments for more efficiently contracting and/or de-contracting stored parameters, such as file identifiers, in a file system, is described. However, likewise, it is noted that in some embodiments, it may be desirable to leave some frequently accessed parameters as not contracted for quicker access.

Redundancies, such as among segments, may be determined and/or identified in a variety of ways. For example, two or more stored parameters or segments thereof may be compared and/or contrasted to find similar or dissimilar aspects. Non-limiting examples of lossless compression techniques include: the Lempel-Ziv (LZ) and LZ-type compression methods, including the LZ77, LZ78, Lempel-Ziv-Welch (LZW), and Lempel-Ziv-Renau (LZR) processes, although, as mentioned, there are many examples of lossless compression techniques, and claimed subject matter is not limited in scope in this respect. In general, more frequently employed segments may be stored in a dictionary coder, for example, that is able to be memory referenced as appropriate. Thus, a dictionary coder may be employed to substitute specific text with a replacement, for example. As a non-limiting illustration, a dictionary coder may specify that text, such as "dat" be replaced by a binary "1." There could be many entries in a dictionary coder specifying various replacements. After encoding of specific text, for example, a replacement will occupy fewer cells of memory. For example, the three characters of "txt" might occupy twenty-one cells for seven bit ASCII characters; however, "txt" would occupy one memory cell if "txt" were replaced with a binary "1," as a non-limiting example.

Figure 2:
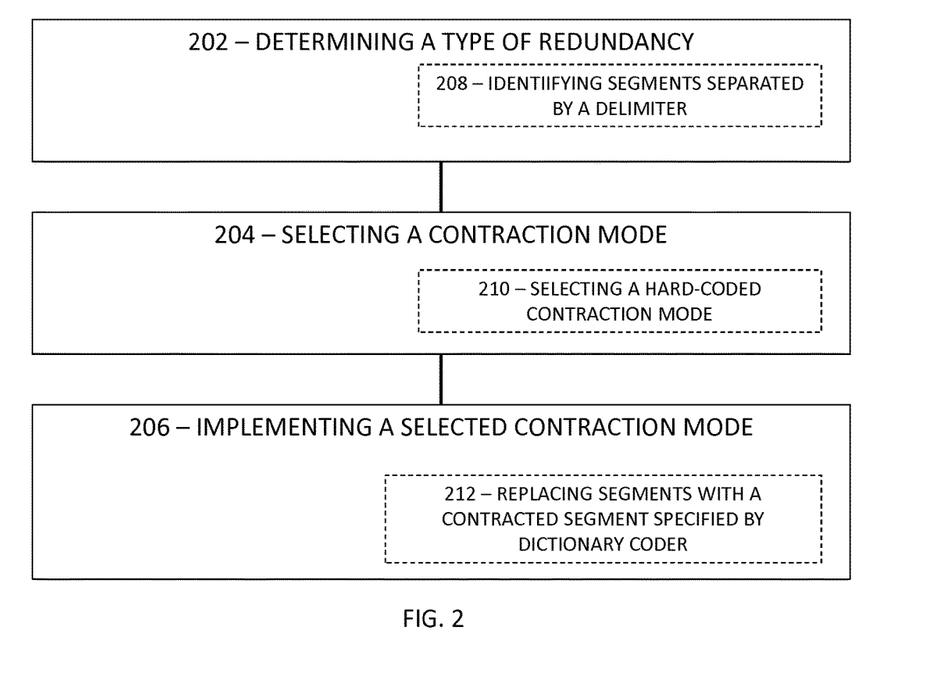
FIG. 2 is a flowchart of a method embodiment.

Thus, a method embodiment, such as shown in FIG. 2, may begin at block 202. For a plurality of segments of a collection of stored parameters, a type of redundancy in at least some segments may be determined. Example methods for determining type of redundancy were discussed above. Likewise, as shown by 208, and was previously discussed, identifying segments separated by a delimiter may be employed. Additionally, there are various ways to determine whether a redundancy comprises a textual redundancy or a numerical redundancy. As a non-limiting example, characters within an ASCII string, for example, may be processed to determine the nature of characters as text or otherwise. At block 204, a contraction mode may be selected, for a plurality of segments having a type of redundancy, based, at least in part, on the type of redundancy. At block 206, a selected contraction mode may be implemented to form contracted segments for segments having a type of redundancy corresponding to the selected contraction mode.

In some embodiments, as mentioned previously, a selected contraction mode may comprise coding in accordance with a dictionary coder. Thus, a method embodiment, such as shown in FIG. 2, may include block 212, in which implementing a selected contraction mode comprises replacing one or more segments with a contracted segment specified by a dictionary coder.

In some embodiments, a separate dictionary coder may be used for separate sub-directories so that segments not present in a particular sub-directory may be omitted, for example. In some embodiments, likewise a separate dictionary coder may also be used for separate epoch (e.g., time periods). A beginning or end of an epoch may be specified by a user, software, or by convention, among other ways.

Besides use of a dictionary coder, for example, to implement a contraction mode, in some embodiments, a type of redundancy may comprise numerical redundancy. In numerical redundancy, two or more segments of a collection of stored parameters, if numerals, may be able to be related by a mathematical relationship. By way of example, consider filenames "Hybrid_735878_SID.dat" and "Hybrid_735877_SID.dat." A mathematical relationship exists between "735877" and "735878", namely that 735877+1=735878, for example.

In an embodiment, therefore, a selected contraction mode may comprise delta-encoding, in which differences between segments, rather than the segments themselves, may be coded. In the example above, therefore, coding may be expressed as "1" or "+1" using the relationship between 735877 and 735878.

Furthermore, in yet another embodiment, a selected contraction mode may comprise encoding a string of numerals in native binary signal form rather than as ASCII text characters. For example, (ignoring delta encoding here), six characters that make up the string of integers "735877" might occupy forty-two cells using seven bits to represent a character. However, if converted into binary form, 20 cells may be employed (that is, decimal 735877 is equivalent to binary 10110011101010000101), again, resulting in better storage utilization.

In some embodiments, a contraction mode may comprise a hard-coded contraction mode, such as illustrated by block 210. As a non-limiting example, commonly used extensions may be consistently contracted. For example, "dat" may always comprise a binary "1," as a simple example. In this context, this is referred to as a hard-coded contraction mode.

Figure 4:
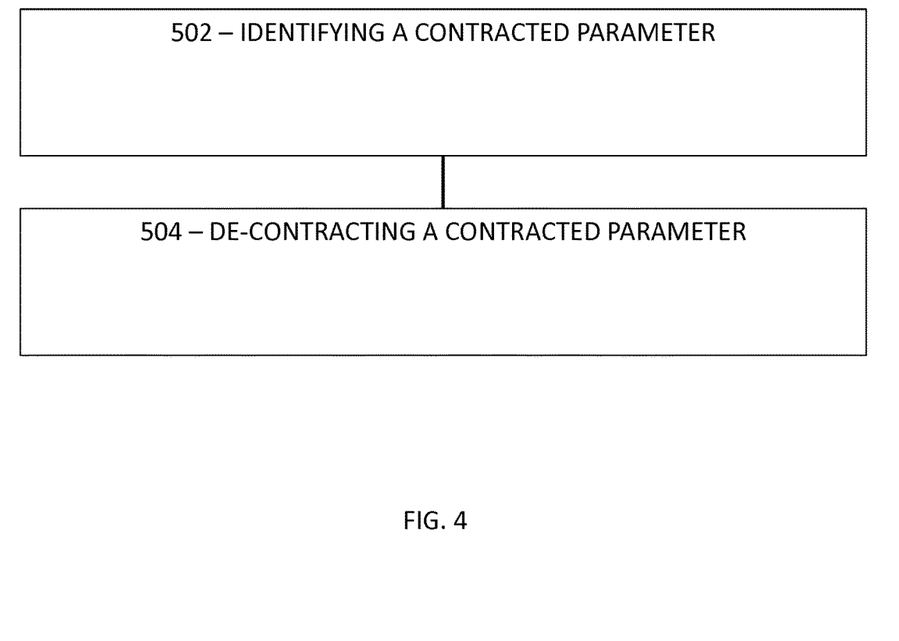
FIG. 4 is a flowchart of another method embodiment.

Additionally, a method embodiment, such as shown in FIG. 4, may begin at block 502. At least one contracted parameter may be identified from a collection of contracted parameters, for example. The at least one contracted parameter may comprise one or more contracted segments. At block 504, the one or more contracted segments of the at least one contracted parameter may be de-contracted to return the at least one contracted parameter to a de-contracted form. Typically, de-contracting may be performed by reversing a process used to reduce or remove segment redundancies. That is, if a contracted segment was formed by "dat" being replaced by a binary "1," then the contracted segment may be de-contracted by replacing the binary "1" with the text "dat," etc.

For purposes of illustration, FIG. 1 is an illustration of an embodiment of a system 100 that may be employed in a client-server type interaction, such as described infra. in connection with rendering a GUI via a device, such as a network device and/or a computing device, for example. In FIG. 1, computing device 1002 (first device' in figure) may interface with client 1004 ('second device' in figure), which may comprise features of a client computing device, for example. Communications interface 1030, processor (e.g., processing unit) 1020, and memory 1022, which may comprise primary memory 1024 and secondary memory 1026, may communicate by way of a communication bus, for example. In FIG. 1, client computing device 1002 may represent one or more sources of analog, uncompressed digital, lossless compressed digital, and/or lossy compressed digital formats for content of various types, such as video, imaging, text, audio, etc. in the form physical states and/or signals, for example. Client computing device 1002 may communicate with computing device 1004 by way of a connection, such as an internet connection, via network 1008, for example. Although computing device 1004 of FIG. 1 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter to limited in scope to illustrative examples.

Processor 1020 may be representative of one or more circuits, such as digital circuits, to perform at least a portion of a computing procedure and/or process. By way of example, but not limitation, processor 1020 may comprise one or more processors, such as controllers, microprocessors, microcontrollers, application specific integrated circuits, digital signal processors, programmable logic devices, field programmable gate arrays, the like, or any combination thereof. In implementations, processor 1020 may perform signal processing to manipulate signals and/or states, to construct signals and/or states, etc., for example.

Memory 1022 may be representative of any storage mechanism. Memory 1020 may comprise, for example, primary memory 1022 and secondary memory 1026, additional memory circuits, mechanisms, or combinations thereof may be used. Memory 1020 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 1020 may be utilized to store a program. Memory 1020 may also comprise a memory controller for accessing computer readable-medium 1040 that may carry and/or make accessible content, which may include code, and/or instructions, for example, executable by processor 1020 and/or some other unit, such as a controller and/or processor, capable of executing instructions, for example.

Under direction of processor 1020, memory, such as memory cells storing physical states, representing, for example, a program, may be executed by processor 1020 and generated signals may be transmitted via the Internet, for example. Processor 1020 may also receive digitally-encoded signals from client computing device 1002.

Network 1008 may comprise one or more network communication links, processes, services, applications and/or resources to support exchanging communication signals between a client computing device, such as 1002, and computing device 1006 ('third device' in figure), which may, for example, comprise one or more servers (not shown). By way of example, but not limitation, network 1008 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store content, such as measurements, text, images, video, audio, etc. in the form of signals and/or states. Thus, a computing device, in this context, may comprise hardware, software, firmware, or any combination thereof (other than software per se). Computing device 1004, as depicted in FIG. 1, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD) players and/or recorders, game consoles, satellite television receivers, cellular telephones, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 1022 may store cookies relating to one or more users and may also comprise a computer-readable medium that may carry and/or make accessible content, including code and/or instructions, for example, executable by processor 1020 and/or some other unit, such as a controller and/or processor, capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be compliant and/or compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method of executing control logic on at least one computing device without further human interaction in which the at least one computing device includes at least one processor and at least one memory, comprising:
    reading control logic from the at least one memory of the at least one computing device for execution on the at least one processor of the at least one computing device; executing the read control logic on the at least one processor of the at least one computing device; and
    storing in the at least one memory of the at least one computing device any results of having executed the read control logic on the at least one processor of the at least one computing device;
    wherein the executing the read control logic comprises executing filename encoding logic;
    wherein the executing the filename encoding logic comprises:
        determining one or more segments sharing one or more common textual or numerical strings or patterns in a collection of stored parameters indicative of particular filenames corresponding to files, wherein the files are distributed on one or more separate computing devices in a network; and
        reducing memory storage requirements of the collection of stored filenames by applying one or more locality-type digital encoding schemes to the one or more segments sharing the one or more common textual or numerical strings or patterns in the collection of stored filenames.

2. The method of claim 1, wherein the collection of stored filenames resides in active memory.

3. The method of claim 2, wherein the collection of stored filenames resides in a sub-directory of active memory.

4. The method of claim 2, wherein the network comprises a distributed file system and wherein active memory comprises a component of the at least one computing device in the distributed file system.

5. The method of claim 1, wherein determining one or more common textual or numerical strings or patterns comprises determining textual redundancy.

6. The method of claim 1, wherein determining one or more common textual or numerical strings or patterns comprises determining numerical redundancy.

7. The method of claim 6, wherein the one or more locality-type encoding schemes for the numerical redundancy comprises delta encoding.

8. The method of claim 1, wherein the one or more locality-type encoding schemes comprise coding in accordance with a dictionary coder, and wherein encoding further comprises replacing one or more common textual or numerical strings or patterns as specified by the dictionary coder.

9. The method of claim 1, wherein the one or more locality-type encoding schemes comprises a hard-coded contraction mode.

10. The method of claim 1, wherein the one or more locality-type encoding schemes comprise an epoch-type encoding scheme.

11. A method of executing control logic on at least one computing device without further human interaction in which the at least one computing device includes at least one processor and at least one memory, comprising:
    reading control logic from the at least one memory of the at least one computing device for execution on the at least one processor of the at least one computing device;
    executing the read control logic on the at least one processor of the at least one computing device; and
    storing in the at least one memory of the at least one computing device any results of having executed the read control logic on the at least one processor of the at least one computing device;
    wherein the executing the read control logic comprises executing filename decoding logic;
    wherein the executing the filename decoding logic comprises:
        logic to determine one or more encoded filenames corresponding to files, wherein the files are stored on separate computing devices in a distributed network and wherein the one or more filenames are encoded responsive to determining one or more common textual or numerical strings or patterns in a collection of stored parameters indicative of the one or more filenames, memory storage requirements of the collection of stored parameters indicative of the one or more filenames to be reduced by applying one or more locality-type digital encoding schemes to one or more segments of the one or more encoded filenames sharing the one or more common textual or numerical strings or patterns in the collection of the stored parameters indicative of the one or more filenames.

12. The method of claim 11, wherein the distributed network comprises a distributed file system, and wherein a substantial portion of the encoded one or more filenames is stored in active memory of the at least one computing device included in the distributed file system.

13. The method of claim 11, wherein the distributed network comprises a Web-scale distributed file system.

14. The method of claim 11, wherein the decoding comprises using a dictionary coder or de-coder to specify the decoding.

15. A system to execute control logic on at least one computing device without further human interaction in which the at least one computing device includes at least one processor and at least one memory, comprising:
   read control logic to read from the at least one memory of the at least one computing device for execution on the at least one processor of the at least one computing device;
   execute logic to execute the read control logic on the at least one processor of the at least one computing device; and
   store logic to store in the at least one memory of the at least one computing device any results of having executed the read control logic on the at least one processor of the at least one computing device;
   wherein to execute the read control logic is to implement filename encoding control logic;
   wherein the filename encoding control logic further comprises:
      at least one computing device capable of communicating with other computing
      devices in a distributed system; the at least one computing device to comprise a main memory to have stored therein a collection of file identifiers corresponding to files, wherein the files are distributed on one or more separate computing devices in a network;
      the at least one computing device further to:
      determine one or more segments sharing one or more common textual or
      numerical strings or patterns in a collection of stored parameters indicative of filenames corresponding to files; and
      reduce memory storage requirements in the collection of stored filenames by applying one or more locality-type digital encoding schemes to the one or more segments sharing the one or more common textual or numerical strings or patterns in the collection of stored filenames.

16. The system of claim 15, the collection of file identifiers to comprise a subcollection of the collection stored of file identifiers;
   the at least one computing device further to:
      determine the one or more segments sharing one or more common textual or
      numerical strings or patterns in a collection of stored parameters indicative of particular filenames for at least some of the file identifiers of the subcollection, and
      encode the determined one or more common textual or numerical strings or
      patterns by applying the one or more locality-type encoding schemes.

17. The system of claim 15, the at least one computing device further to identify the one or more common textual or numerical strings or patterns in the collection of stored filenames to be separated by one or more delimiters of at least some stored file identifiers in the collection of stored file identifiers.

18. The system of claim 15, the collection of stored file identifiers to reside in a sub-directory of the main memory of the at least one computing device.

19. The system of claim 15, the main memory further to include a collection of stored encoded file identifiers; and the at least one computing device further to: identify at least one encoded file identifier from the collection of encoded file identifiers and decode the at least one encoded file identifier.

20. The system of claim 19, the main memory to include a collection of stored frequently accessed file identifiers to not be encoded.

* * * * *